(12) United States Patent
Stevens

(10) Patent No.: US 12,392,926 B2
(45) Date of Patent: Aug. 19, 2025

(54) METHOD AND APPARATUS FOR DROPSONDE DEPLOYMENT

(71) Applicant: Voltitude Ltd, Hampshire (GB)

(72) Inventor: Paul Stevens, Hampshire (GB)

(73) Assignee: VOLTITUDE LTD, Hampshire (GB)

( * ) Notice: Subject to any disclaimer, the term of this patent is extended or adjusted under 35 U.S.C. 154(b) by 527 days.

(21) Appl. No.: 17/532,264

(22) Filed: Nov. 22, 2021

(65) Prior Publication Data

US 2022/0274720 A1 Sep. 1, 2022

(30) Foreign Application Priority Data

Nov. 19, 2020 (GB) ...................................... 2018222

(51) Int. Cl.
| | |
|---|---|
| *G01W 1/08* | (2006.01) |
| *B64D 1/02* | (2006.01) |
| *G01W 1/10* | (2006.01) |
| *B64B 1/00* | (2006.01) |
| *B64C 39/02* | (2023.01) |
| *B64U 101/35* | (2023.01) |

(52) U.S. Cl.
CPC ................. *G01W 1/08* (2013.01); *B64D 1/02* (2013.01); *G01W 1/10* (2013.01); *B64B 1/00* (2013.01); *B64C 39/02* (2013.01); *B64U 2101/35* (2023.01)

(58) Field of Classification Search
CPC .......... G01W 1/08; G01W 1/10; B64C 39/02; B64D 1/02
See application file for complete search history.

(56) References Cited

U.S. PATENT DOCUMENTS

| | | | | |
|---|---|---|---|---|
| 6,056,237 A | * | 5/2000 | Woodland | B64C 3/56 244/49 |
| 6,550,717 B2 | * | 4/2003 | MacCready | B64D 37/30 244/45 R |
| 6,931,247 B2 | * | 8/2005 | Cox | H04B 7/18504 455/430 |

(Continued)

FOREIGN PATENT DOCUMENTS

| | | |
|---|---|---|
| CN | 102183962 A | 9/2011 |
| CN | 105000183 B | 10/2015 |

OTHER PUBLICATIONS

Search Report in corresponding GB Application No. 20188222.6 mailed on May 19, 2021, 1 page.

(Continued)

*Primary Examiner* — Jill E Culler
(74) *Attorney, Agent, or Firm* — MH2 Technology Law Group LLP

(57) ABSTRACT

A measurement system comprising a plurality of High-Altitude Pseudo Satellites (HAPS), comprising fixed wing HAPS, having a span loaded fixed wing, an aspect ratio greater than 15 and wing loading less than 6 kg/m2, and/or lighter than air HAPS, each HAPS carrying a plurality of lightweight dropsondes, each dropsonde including sensors and a transmitter, where the plurality of high-altitude pseudo satellites located in a geographical array over at least part an area of the earth. The dropsondes are deployed from the HAPS at predetermined times, such that the deployed dropsondes gathering sensed data after deployment, and the sensed data transmitted to the HAPS.

16 Claims, 6 Drawing Sheets

(56) References Cited

U.S. PATENT DOCUMENTS

| | | | | |
|---|---|---|---|---|
| 7,802,756 | B2 * | 9/2010 | Kendall | B64D 31/06 |
| | | | | 244/45 R |
| 8,210,467 | B2 * | 7/2012 | Hubbell | G01W 1/08 |
| | | | | 244/190 |
| 8,322,650 | B2 * | 12/2012 | Kelleher | B64C 23/069 |
| | | | | 244/45 R |
| 9,665,103 | B1 | 5/2017 | Bonawitz et al. | |
| 9,977,963 | B1 * | 5/2018 | Fendell | B64C 39/024 |
| 10,914,865 | B1 * | 2/2021 | Fendell | G01W 1/08 |
| 2009/0326792 | A1 | 12/2009 | McGrath | |
| 2014/0043172 | A1 * | 2/2014 | Manobianco | G01W 1/08 |
| | | | | 340/870.07 |
| 2017/0299771 | A1 | 10/2017 | Fendell | |
| 2020/0401138 | A1 | 12/2020 | Rentz et al. | |

OTHER PUBLICATIONS

Cardinali, "An assessment of using dropsonde data in Numerical Weather Prediction", Technical memorandum, (2000), No. 291, 21 pages.

Candido, Salvatore. "Autonomous, Persistent Meteorological Observation Networks using Fleets of High Altitude Platforms." Earth and Space Science Open Archive ESSOAr (2021).

Cohn, Stephen A. et al. "Driftsondes: Providing in situ long-duration dropsonde observations over remote regions." Bulletin of the American Meteorological Society 94.11 (2013): 1661-1674.

Du, Huafei et al. Station-keeping performance analysis for high altitude balloon with altitude control system.

Search Report in corresponding GB Application No. 2116648.3 mailed on Dec. 17, 2021, 1 page.

* cited by examiner

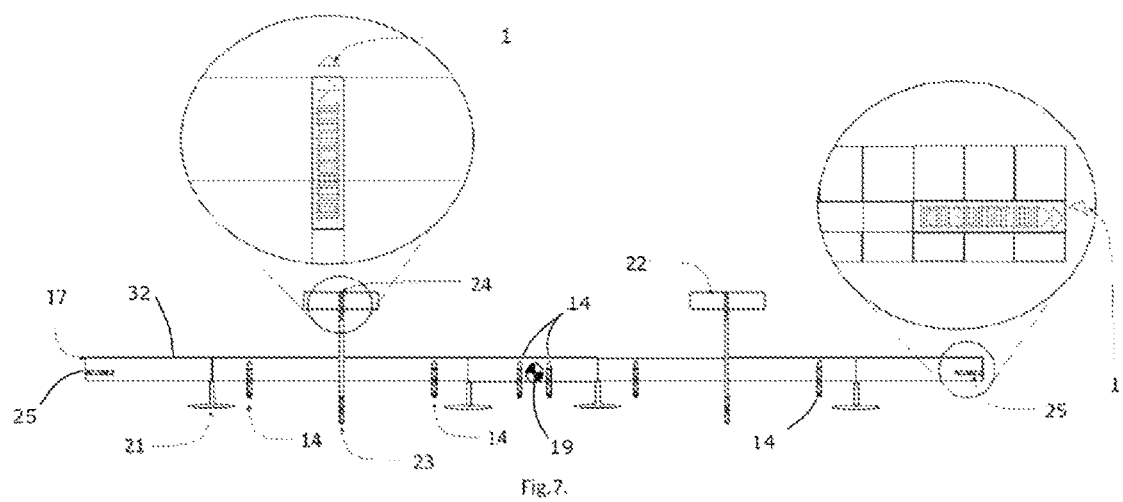
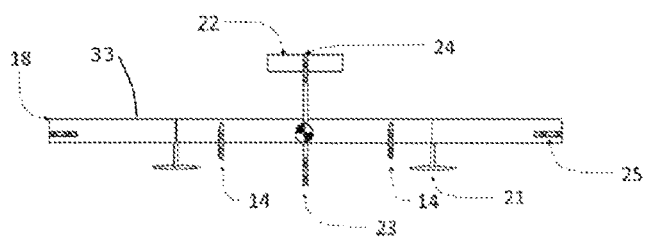 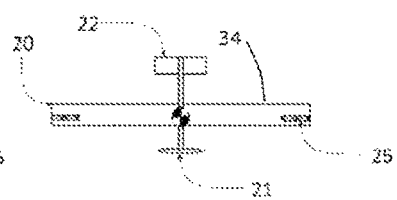
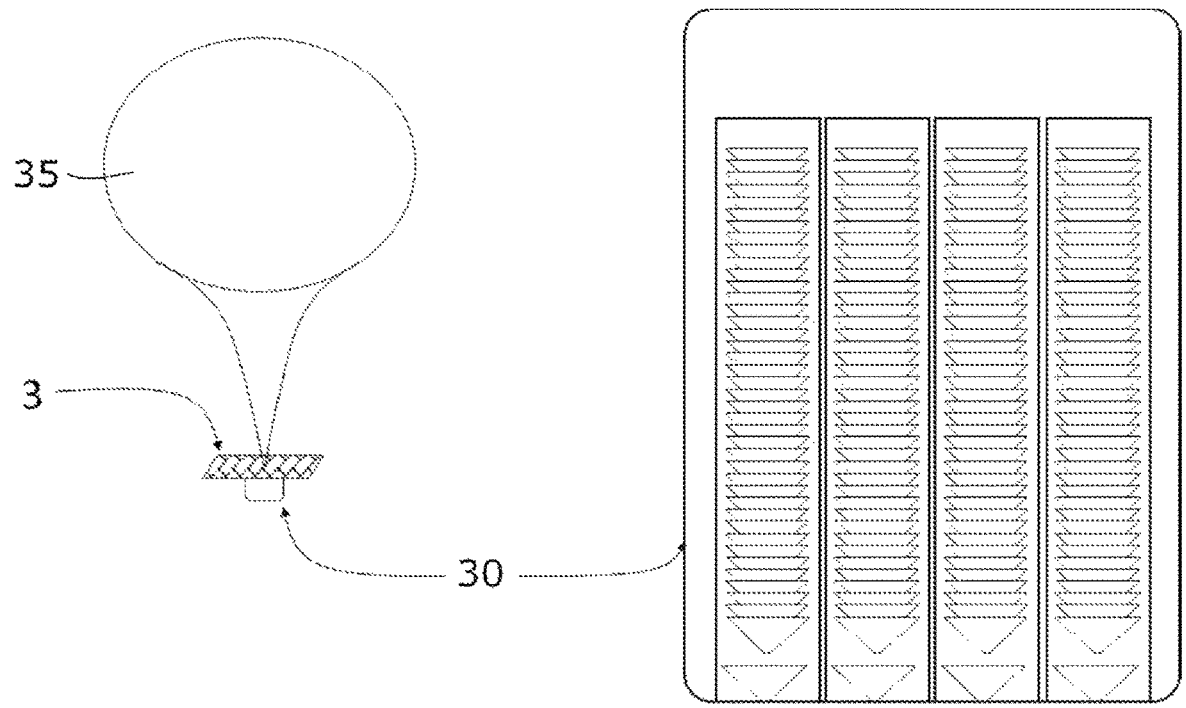
Fig. 10

METHOD AND APPARATUS FOR DROPSONDE DEPLOYMENT

CROSS-REFERENCE TO RELATED APPLICATIONS

The present application claims the benefit of priority of UK Patent Application No. GB2018222.6, filed Nov. 19, 2020, the disclosure of which is incorporated by reference herein in its entirety.

The present specification relates to a method and apparatus for dropsonde deployment. In particular, although not exclusively, some embodiments of the invention relate to a network of dropsonde deployment vehicles and the receiving of the dropsonde data. Other embodiments relate to improvements in the dropsonde itself.

Modern meteorological forecasting is performed by super computers which use mathematical models of the atmosphere, oceans, and land masses to predict the weather in the future based on currently observed weather conditions. This process is called Numerical Weather Prediction (NWP) and its accuracy i.e. the degree to which future weather predictions agree with future weather observations, reduces the further into the future forecasts are attempted.

This reduction in accuracy is a result of three related mechanisms: the completeness and accuracy of the initialisation conditions (current weather observations); limitations of the NWP model being used (e.g. resolution and timestep interval, boundary conditions and assumptions); but most importantly the chaotic nature of the fluid dynamics equations used in weather forecasting. The final point identifies the world's weather as a chaotic system, in which it is impossible to make accurate long term prediction since even the smallest of errors or deviations in initial conditions and imperfect models amplify their errors with time, making long term accurate weather forecasting impossible.

Modern NWP systems typically produce high accuracy over short range forecasting (0-3 days) but variable accuracy over mid-range forecasting (3-15 days). Useful accuracy beyond 5 days is not typically achieved, although statistically significant improvements can be achieved out to 15 days using the technique of ensemble forecasting [Weickmann, Klaus; Jeff Whitaker; Andres Roubicek; Catherine Smith (2001 Dec. 1). "The Use of Ensemble Forecasts to Produce Improved Medium Range (3-15 days) Weather Forecasts"].

The NWP models use current weather observations as their initialisation state. The global weather observation system is coordinated by the World Meteorological Organisation (WMO) which use a system of standardised observations primarily collected using balloon launched radiosondes and remote sensing meteorological satellites. Other less frequent examples of sensing systems which contribute to the global observation system include among others: ocean temperature sensors; research aircraft performing direct measurements; and research flights producing data collected from dropsondes.

A radiosonde is a meteorological sensor launched and carried to the upper atmosphere by balloon. Radiosondes are launched from ground level, ascending through a column of atmosphere, taking regular measurements of meteorological data, which it transmits via a radio datalink to a receiving system. The receiving system is normally also located on the ground, usually near where the radiosonde was launched. Radiosondes are used throughout the world and are mainly launched from land-based locations but are also sometimes launched from ships out over the oceans.

Remote areas, particularly over the oceans, represent regions with the least observation coverage and contribute significantly to reducing the potential range of accurate NWP forecasting. Dropsondes are one of the only viable meteorological sensors for use over the oceans and other remote areas, where there is no cost-effective facility to permit regular release of radiosondes. Dropsondes operate a bit like a radiosonde in reverse, in that once deployed from a high-altitude aircraft, they descend through a column of atmosphere, taking regular measurements of meteorological data as they descend to sea or ground level. Like a radiosonde, dropsondes are single use, disposable sensors. The data a dropsonde collects is transmitted via a radio datalink to a receiver on the aircraft which dispensed it.

Current dropsonde missions are operated as research flights using the Global Hawk Unmanned Air System (UAS), manned C130J variants and other manned and unmanned aircraft. Existing dropsonde delivery systems present limited persistence, high cost of operation and infrequent and irregular data gathering with little continuity between data gathering opportunities. The value of the data from dropsondes to NWP forecasting has been evaluated through many research studies (e.g. C. Cardinali "An assessment of using dropsonde data in numerical weather prediction", Research Department, European Centre for Medium Range Weather Forecasts).

Existing dropsondes are designed to be robust, handled by people, prior to being dispensed through a tube into the airflow from a fast-moving aircraft. They are typically between 300 g and 500 g in weight and descend at about 10 m/s-15 m/s under a small drogue parachute. The mass of a current dropsonde design is considered small in contrast to the huge payload carrying potential of the aircraft used to dispense them. These aircraft are conventional and as such are of endurance limited to less than 24 hrs, or <36 hrs in the case of the Global Hawk system.

CN102183962A proposes deploy dropsondes by unmanned aerial vehicle (UAV) dropsonde and method for releasing and controlling same.

CN105000183B proposes deploying a self-propelled dropsonde system, having a hydrogen fuel cell propelled small UAS or drone, which is alleged can be flown to an altitude of 20 km where upon it can release some or all of its payload of dropsondes. The persistence of such a drone is likely in the region of 24 hrs, and therefore limited range and limited time on station to perform dropsonde dispensing operations.

Whether deployed by drone, aircraft or from a balloon, deploying a large number of dropsondes at different locations in a co-ordinated manner, particularly at regular intervals, is difficult and expensive.

There currently exists no cost effective and economically viable method to extend the coverage, resolution, and frequency of observations over remote areas, particularly the great oceans.

The object of the present invention is to provide a convenient and cost effective method and apparatus to deploy dropsondes at one or more locations.

According to the present invention, there is provided a measurement system, HAPS and dropsonde according to the independent claims.

The use of ultra-lightweight dropsondes stowed and deployed from long endurance solar electric High-Altitude Pseudo Satellites (HAPS) platforms provides an efficient and convenient means of gathering accurately distributed dropsonde data at synchronised time instances over relatively long time periods which have previously been unavailable.

A High Altitude Pseudo Satellite (HAPS) is a high altitude platform which operates with long endurance in the stratosphere and offers a station keeping capability. HAPS are designed using spacecraft methodology to survive long exposure to the low pressure and high thermally cycling day-night environment and optimized for persistent station keeping in the stratosphere. This necessitates a regenerative solar electric power system and extremely low power required for cruise at its operating altitude in the stratosphere. For fixed wing HAPS low power for cruise is achieved through span loaded design to minimize structural mass fraction and minimize drag, while station keeping is achieved through a design which flies faster than the wind speed in the lower stratosphere. Conventional UAV operate in the troposphere, use power systems which are non-regenerative in flight and so are short endurance. For lighter than air HAPS, low power for cruise is achieved through buoyancy of the balloon, station keeping is coarse, using changes in altitude to select the favorable wind direction to achieve the overall navigation objective, this is as opposed to a weather balloon which drifts as a free flying balloon with the wind, unable to tactically change altitude and so has no station keeping capability.

For the larger HAPS, due to their vulnerability during launch and recovery, it is not a desirable use case to use HAPS for short missions after which they would need to land, re-stock their payload before resuming service delivery. Lighter than air HAPS, i.e. balloons, are generally single use platforms and fixed wing HAPS are described as re-usable disposable aircraft, reflecting in both types the most suitable missions are long endurance. The implementation challenges for dropsonde deployment from HAPS are overcome by proposing an ultra-light weight dropsonde design, which can be stacked in a relatively low volume and released through an integral dispensing system. This is only possible on a HAPS because of the benign operating environment and low airspeed of dropsonde release. Through this invention, it is possible to deploy large and medium HAPS for many months at a time on dropsonde dispensing missions, or small HAPS can be deployed to wait over specific areas of interest e.g. military areas to release a dropsonde in response to a specific demand, e.g. from a military command centre wanting to make a Go/No Go decision for an air strike based on the current meteorological conditions over the target area. Alternatively, small HAPS could be deployed to loiter over an area waiting to dispense dropsondes once a specific event has occurred e.g. tropical storm formed and detectable via satellite. The existing proposals for UAV dispensed dropsondes are of such limited dropsonde capacity, endurance, and range, that they cannot perform such "loiter until" missions.

All other dropsonde dispensing systems have extremely limited endurance, limited range and can only support focused dropsonde deployment such as research flights or temporary augmentation of the meteorological observation system. The proposed invention enables cost effective, multiple simultaneous dropsonde release over large remote areas to enhance the global meteorological observation system accurately and regularly. This will enable more accurate initialisation of NWP models to permit increased accuracy in medium and long-range forecasting.

The invention will now be described, by way of example, with reference to the drawings, of which FIG. 1 depicts an embodiment of the HAPS and dropsonde deployment and communication system;

FIGS. 7 to 9 are plan views of embodiments of HAPS;

FIG. 10 is a side view of an another embodiments of a HAPS; and

Figure 1:
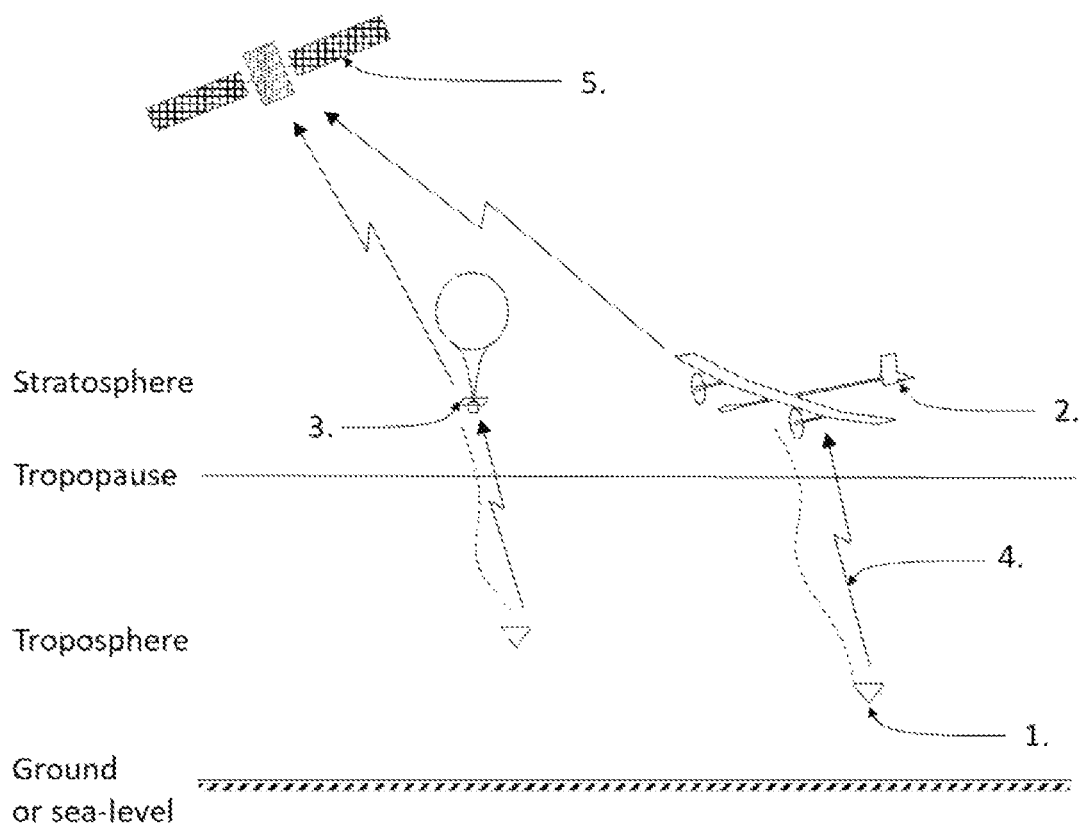

Referring to FIG. 1, the system includes a number of High-Altitude Pseudo Satellites (HAPS), either being fixed wing HAPS 2, lighter than air HAPS 3 or a combination of each. Dropsondes 1 are deployed from the HAPS 2, 3 so that the dropsondes 1 fall through the atmosphere taking measurements as they descend. The measured data are transmitted from the dropsondes 1 by a radio data link 4 to receiver equipment on the HAPS 2, 3. A particular dropsonde 1 will typically transmit the measured data to the HAPS 2, 3 which deployed it, though equally the dropsonde 1 may transmit the measured data to another HAPS 2, 3 or other receiving equipment in the vicinity. The measured data is then transmitted from the HAPS 2, 3 to a satellite 5 by another radio link to be disseminated in turn to receiving equipment on the ground for onward transmission and processing for meteorological forecasting and analysis.

The HAPS 2, 3 can loiter for weeks or months regularly or irregularly deploying dropsonde 1 over either fixed location, alternate locations, along a route, or on demand while positioning over an area or a meteorological feature of interest, e.g. a forming hurricane or tropical cyclone.

Figure 2A:
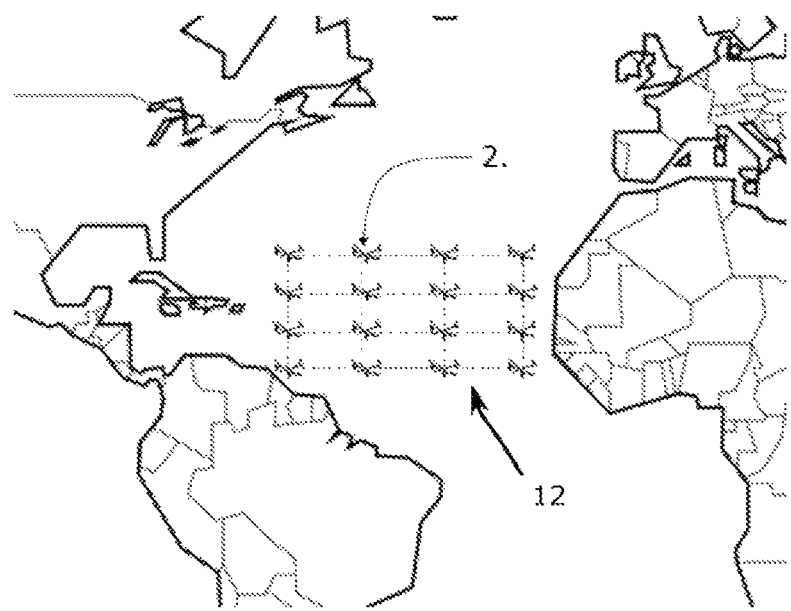
FIG. 2a depicts an embodiment of the possible constellation of HAPS.

Referring to FIG. 2a, multiple HAPS 2 equipped with dropsonde dispensers can be used to form a large area grid constellation 12. Such large area grid constellations 12 can cover many thousands of kilometres to enable the systematic release of dropsondes from individual HAPS 2, 3 simultaneously or periodically over entire regions e.g. over large areas of oceans where there are few alternative sources of metrological data.

The large area grid constellation 12 shown here is a rectilinear array, though other arrays could equally be used. Trained meteorologists skillful in operating Numerical weather prediction (NWP) models and assessing their outputs, use different products of the forecast to deduce where in the atmosphere the significant sources of forecast uncertainty are located. This can include inspection of the ensemble forecast products to reveal areas and regions of the atmosphere where iterations of NWP model output are seen to diverge fastest (synonymous to regions of greatest error). This means observations are more important in some areas than in others; it is desirable to make more accurate analyses in areas where forecast errors grow rapidly, e.g. baroclinic zones (a region where there is a large horizontal change in temperature, humidity, and or pressure, such as across a frontal zone) and in areas of intense convection such as low pressure regions, abundance of cumulonimbus activity, tropical storms, tropical cyclones and hurricanes. The optimum arrangement of the constellation is therefore dynamic, one which can provide regularly spaced observations from the remote areas as well as respond to the observed atmospheric state by permitting increased spatial and temporal resolution over regions identified as desirable to make more accurate and regular observations.

The global observation system administered through the World Meteorological Organisation (WMO), operates on a basis of at least 2 observations per day, taken at 0000Z and 1200Z (Coordinated Universal Time) and occasionally also at 0600Z and 1800Z. The regularly spaced portion of the constellation should release dropsondes in a coordinated manner to fit in with the timing of the global observation system and release dropsondes at these times. However, when tasked to move over specific meteorological features presenting strong convection or baroclinic zones, meteorologists may request more frequent release of dropsondes to typically support 6 hourly updates to the NWP model runs.

Figure 2B:
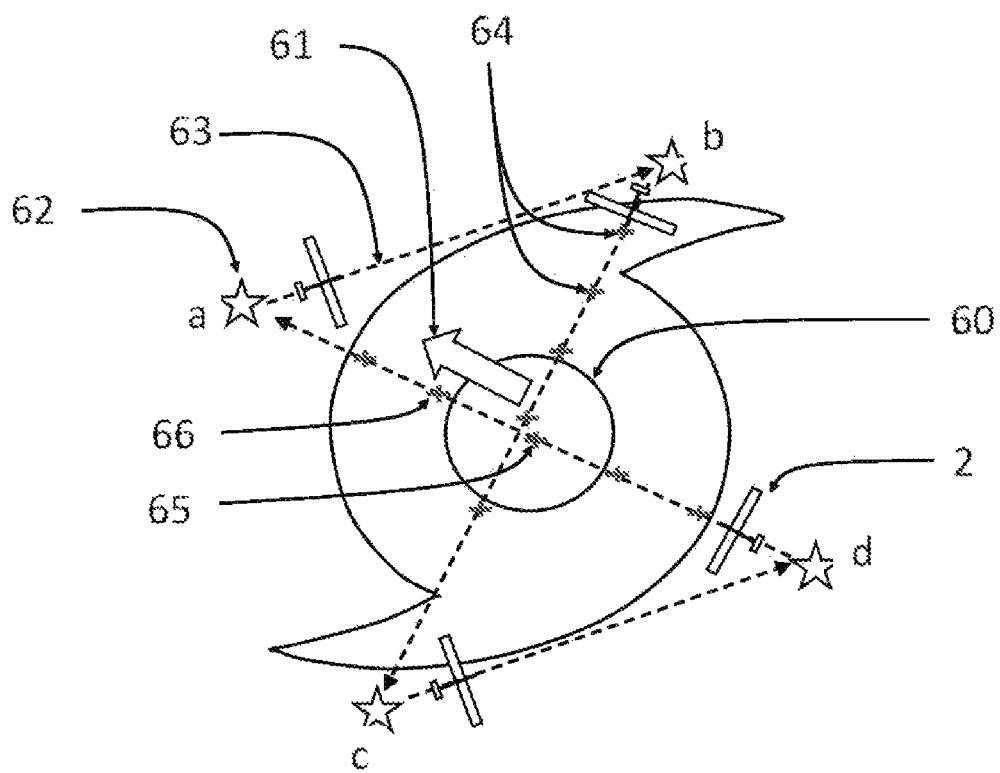
FIG. 2b depicts a detail of another embodiment of the possible constellation of HAPS.

An example of a meteorological feature of intense interest to meteorologists is the monitoring of tropical storm intensification and track prediction. With reference to FIG. 2b, at least two HAPS 2 equipped with dropsonde systems are used to provide increased temporal and spatial resolution observations over a large tropical storm or hurricane. On average, the eye of a hurricane 60 is 50 km diameter and about 160 km total diameter. Recent satellite imagery is used to estimate the center of the storm or hurricane and determine approximate track direction and speed 61. Based on this information, a system of navigation waypoints 62, is established to create a ground track 63 in the sequence "a, b, c and d". These waypoints are transmitted to the HAPS which automatically navigate along the ground track between each waypoint to create an approximate "figure of eight" above the storm and most critically, result in two perpendicular tracks which cross the diameter of the storm and pass over the eye of the storm. One of these perpendicular tracks 65 should be aligned with the track of the storm to deliver the most useful observations. The HAPS are managed such that two of them will track on perpendicular lines over the eye of the storm at least once every 6 hrs. Dropsondes 64 are dispensed routinely along the two perpendicular tracks which pass over the eye of the storm, these aid in locating the pressure center of the storm and refine the geometry of the waypoint positions as the storm moves and intensifies. The most critical dropsondes are those dispensed over the pressure center of the storm 65 and those dispensed over the cloud wall which surrounds the eye of the storm 66 and is the part of the storm which contains the strongest winds. At 65 kft altitude, HAPS will have a True Air Speed (TAS) of approximately 80 km/hr. For an average hurricane, the total "figure of eight" track is approximately 480 km, this means that the approximate figure of 8 track can be completed once every 6 hrs enabling two HAPS to provide synchronous dropsonde readings along the two perpendicular tracks at least once every 6 hrs to coincide with NWP model initialization and provide the latest and most up to date observations of storm intensification.

Figure 3:
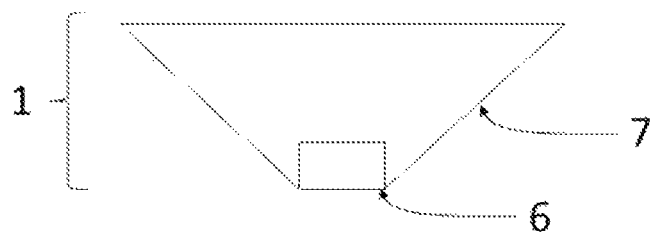
FIG. 3 is a side elevation of an embodiment of a dropsonde.

Referring to FIG. 3, the dropsonde 1 is of an ultra-light "shuttlecock" design, significantly lighter (approximately 10 times lighter) than conventional dropsondes, and is formed from a small Printed Circuit Board (PCB) 6, mounted in the base of a biodegradable card conic shape or shuttlecock 7 which acts as the retarding area or drogue to limit the dropsonde's rate of descent to about 10 m/s Equivalent Air Speed (EAS). The shuttlecock 7 is designed to ensure the dropsonde 1 does not habitually tumble during freefall but descends generally in the indicated orientation to provide the best orientation for the integral antennas. The PCB 6 is a modern radiosonde unit, and includes the capability for measuring air temperature, humidity, pressure, and to derive wind speed from an integral Global Navigation Satellite System (GNSS) receiver. It also includes insulation and a battery sufficient to power the unit during its descent which lasts for approximately 20 to 60 minutes, depending on convective effects encountered over the descent. The GNSS antenna is integral to the PCB 6 and the data link antenna is a wire integral to the shuttlecock structure 7, both antennas being orientated to offer greatest sensitivity and transmissivity in the upward hemisphere to maximise GNSS satellite reception and data link margin back to the HAPS carrying the dropsonde 1 receiving equipment.

Figure 4:
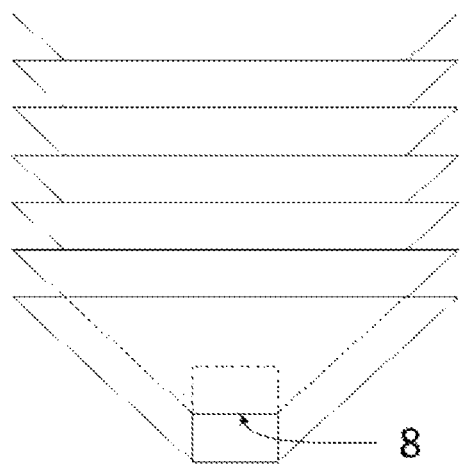
FIG. 4 is a side elevation of several of the dropsondes in a stacked configuration.

FIG. 4. shows a plurality of dropsondes 1 shown in FIG. 3 which can be stacked within each other, the outer surface of the shuttlecock 7 of one dropsonde 1 fitting within the cavity of the shuttlecock 7 of the next dropsonde 1.

Ideally, the shuttlecock is coninical, or more cup-shaped or fustroconical; it will be appreciated that different shapes and tapers could be employed to alter the descent characteristics of the dropsonde. Paper is a suitable material for the cone. Instead of a cone or truncated cone, the retarding elements of the dropsonde could be flaps or feathers spaced circumferentially, and ideally being inclined in a similar way to the cone. Two feathers could comprise two elements of a dipole antenna on either side of the PCB as the drogue to ensure the dropsonde descends at the desired speed. This offers some advantages over the cup and cone arrangement in that it uses a simpler UHF antenna for the datalink transmitting dropsonde data to the host platform than the conformal antenna used with cup and cone options. The retarding feathers in this arrangement are formed by encapsulating the two elements of the thin sprung steal wire dipole antenna with paper or other similar material to create sufficient drag area to control the descent speed within the optimum range 10 m/s-15 m/s, while being light weight and stackable. Similarly, a single trailing wire antenna, embedded in a trailing ribbon, will perform as an adequate retarding drogue, with the single wire performing as a monopole type antenna, using the PCB as its counterpose. Such dropsondes offer an easily mass produced shape and results in stable, non-tumbling descent at the desired rate of descent of between 10 m/s-15 m/s for the PCB and cup total mass of between 30 g and 50 g.

Figure 5:
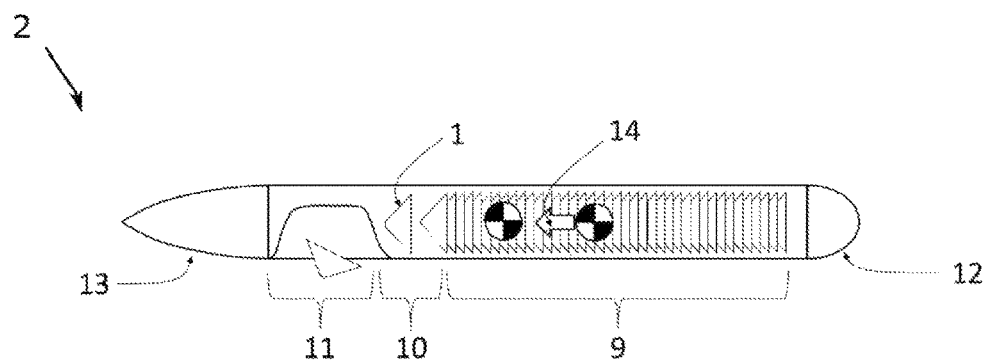
FIG. 5 is a side section of an embodiment of a dropsonde dispenser.

Referring to FIG. 5, a dropsonde dispenser 30 includes a substantially tubular main body comprising a conveyer mechanism 9, separator mechanism 10 and aperture 11.

The dropsondes 1 are stored stacked in the conveyer mechanism 9 in a horizontal orientation.

Each dropsondes 1 includes an electrical contact 8 on the PCB 6, this contact 8 forming an electrical connection with a conducting member in the conveyer mechanism 9 of the dropsonde dispenser 30. This connection is used to keep the PCB of each stored dropsonde 1 in a hibernation state and ensure the dropsonde batteries remain in a healthy state of charge. The contact 8 and electrical connection between each dropsonde 1 and the conveyer mechanism 9 permit an external power supply, provided by the host HAPS 2, 3, to perform environmental conditioning (heating) to protect the stored dropsondes 1 from getting too cold while in hibernation. Falling below the rated temperature of the battery could cause the dropsonde to fail to initialise.

The conveyer mechanism 9 feeds the dropsonde stack down the tube, presenting the dropsondes one at a time to a separator mechanism 10 which separates the leading dropsonde from the stack and causes it to initialise and self-power. Once initialised and powered from its own battery, transmission of data from its sensors starts and the receiving system onboard the HAPS can confirm if GNSS lock has been established.

Once GNSS lock is established, the separator dispenses the initialised dropsonde through the dispensing aperture 11. The electrical connection between each dropsonde 1 and the host platform permits the controlling electronics within the dispensing tube to track and report the number of dropsondes remaining.

The dropsonde dispenser 30 is scalable in length to accommodate as many dropsondes as can be carried by the host HAPS platform's local structural payload mass allowance.

The main body of the dropsonde dispenser 30 can be fitted with an aerodynamic faring 13, 12 at the front and rear for installation on a fixed wing HAPS to help minimise drag.

Indicated in FIG. 5 is the approximate range of tube Centre of Gravity (CG) 14 as the dropsonde dispenser 30 transitions from full to empty. This is significant for fixed wing HAPS which often have limited tolerance to changes in their CG.

Figure 6A:
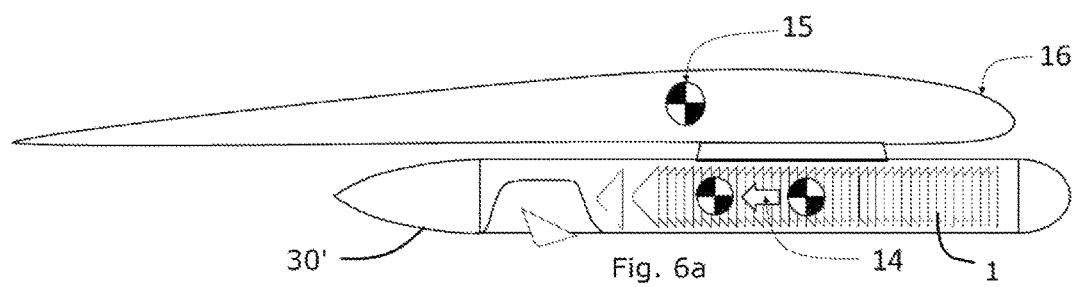
FIGS. 6a and 6b is a side section of embodiments of a dropsonde dispenser secured to a HAPS.
Figure 6B:
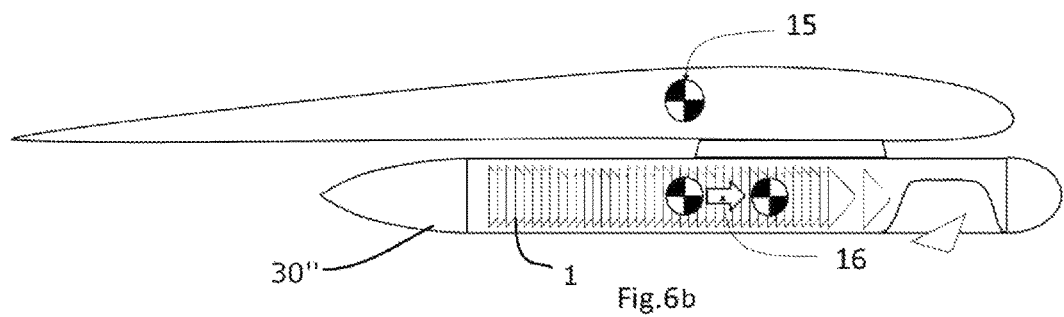
Figure 11:
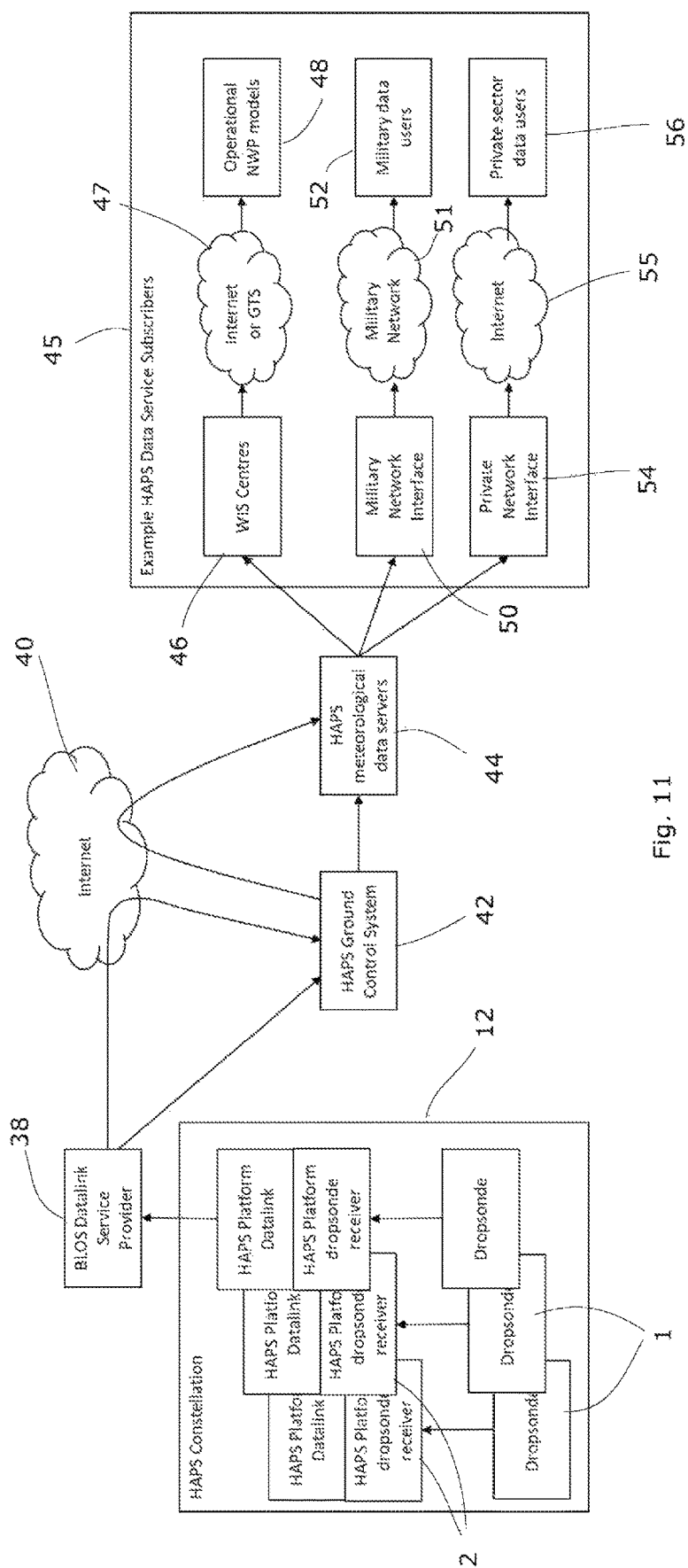
FIG. 11 is diagrammatic view of dropsonde and HAPS measurement data network.

Referring to FIG. 6, to minimise dropsonde dispenser impact on host platform, two dropsonde dispensers may be located near each other, underslung from the wing 16 of a fixed wing HAPS 2. As shown in FIG. 6a, the CG 14 of a dropsonde dispenser 30' moving generally rearwards through progressive release of its dropsondes 1, while the FIG. 6b shows the CG 16 of a forward dropsonde dispenser 30" moves forward as it progressively dispenses its dropsondes 1. Two such orientations can be used alternately to minimise the impact of dispensing dropsondes on the desired host platform CG position 15 as the combined CG will remain substantially laterally and longitudinally fixed.

The impact on host platform CG resulting from dispensing dropsondes can be managed through positioning and integrating the dropsonde dispenser 30 such that fore and aft, or port and starboard dispensers are used alternately to maintain the host fixed wing HAPS 2 CG in its specified safe range.

Referring to FIG. 7 a large span HAPS 32 consisting of a span loaded structure of nominal span 35 m including but not shown, an integrated power storage and power generation system, propulsion systems 21 and tail assemblies 22. The dropsonde dispensers are integrated here in example locations which include port and starboard mounted dispensers 25, aft tail dispensers 24, nose dispensers 23 and underside wing dispensers 14.

The dropsonde dispensers 14, 23, 24, 25 are distributed so that they are counterbalanced; chiefly this means that the nose dispensers 23 and tail dispensers 24 will counterbalance each other in the front-to-rear axis, and the underside wing dispensers 14 and port and starboard dispensers 25 will be balanced about the lateral axis, so that the HAPS CG 19 is located substantially at the centre of the HAPS wingspan and within permitted longitudinal tolerances. The dispensers are also distributed such that the CG of the HAPS is substantially coincident with, or possible forward of, the centre of lift.

The payload of dropsondes may typically be between 15 kg and 25 kg. Such a configuration would permit between 375 and 625 dropsondes, enough for between 6- and 10-months service with one dropsonde dispensed every 12 hrs.

Similarly, FIG. 8 depicts a medium span HAPS 33 consisting of a span loaded structure 18 of nominal span 20 m including but not shown, an integrated power storage and power generation system, propulsion systems 23 and tail assembly 22, capable of carrying a distributed payload of dropsondes of between 6 kg and 10 kg. The dropsonde dispensers are integrated in example locations which include port and starboard mounted dispensers 25, aft tail dispenser 24 counterbalanced by a system of a dispensers 23 mounted on the fuselage nose and underhung from the wing 14. Such a configuration would permit between 150 and 250 dropsondes, enough for between 2 to 4 months' service with one dropsonde dispensed every 12 hrs.

FIG. 9 illustrates a small span HAPS 34 of just 10 m nominal span 20. Such a small platform could offer improved launch and recovery operating envelope than the larger HAPS and because of its very low-cost and disposable nature, but long endurance and range, such a platform could loiter over hazardous locations e.g. tropical storms, or military areas of interest where there is a greater loss potential and release on demand its more limited stock of dropsondes, reserving these for when they are most needed or scenarios where the larger HAPS have had to depart due to environmental risk or other hazards. A small fixed wing HAPS like this can only support a small number of dropsonde dispensers, perhaps only between 1 kg to 4 kg of distributed payload and would therefore only permit between 25 and 100 dropsondes to be carried.

In the case of lighter than air HAPS (3), as depicted in FIG. 9, dropsonde dispensers 30 can be integrated into the balloon's 35 payload accommodation vertically since there is negligible drag considerations to be managed during operation of a balloon. The scalability of the dispensing tubs and the number of tubes used, can be selected to match the payload capacity of the HAPS balloon in question. In the case of HAPS balloons of the sort operated by Google Loon®, each balloon could accommodate approximately 10 kg of payload, or about 250 dropsondes. Unlike fixed wing HAPS, HAPS balloons cannot perform accurate station keeping, but a constellation of 15 to 20 HAPS balloons could provide consistent quality of service over a location or region and between them support many months of dropsonde capacity, with the closest balloon(s) to the desired dropsonde release location being selected to dispense dropsondes at the desired time.

The ultra-light dropsondes proposed for use with HAPS dispensing systems present an extremely low intrinsic hazard to other aircraft and third parties due to their exceptionally low kinetic energy during descent (typically just 2.5 J at sea-level). However, it is envisaged that to dispense dropsondes safely and regularly from the stratosphere, there should be a system which automatically confirms that the imminent release of a dropsonde will present no obvious hazard to other aircraft.

Both fixed wing and lighter than air HAPS carry transponders capable of Automatic Dependent Surveillance-Broadcast (ADS-B). This is a mature "Commercially Off The Shelf" (COTS) technology, in which an aircraft determines its position using GNSS and periodically broadcasts this information enabling other systems receiving this signal to track the aircraft. ADS-B Out is the periodic transmission of information about the transmitting aircraft, including its identification, current position, altitude, and velocity. ADS-B In is the reception of this type of data by aircraft equipped with ADS-B In receivers. Although neither fixed wing nor lighter than air HAPS can perform collision avoidance manoeuvres in the traditional sense, such data exchange can be used by HAPS to automatically avoid navigation in the immediate proximity of other HAPS. This data when received by the HAPS dispensing system from other aircraft operating below the HAPS at lower altitudes, can be used to automatically delay the release of a dropsonde. This ensures that the release of a dropsonde will not contribute a hazard to the safe operation of other aviation platforms operating beneath the HAPS.

The operator of the HAPS dropsonde system commands a "no-drop proximity limit" which the dispensing system checks prior to dispensing a dropsonde. The no-drop proximity limit is determined based on a safety assessment (safety case) of the location or region of proposed operation. In its simplest form, this assessment is based on the distance a typical passenger jet travels in the time taken for the dropsonde to descend to below the nominal cruise altitude of the passenger aircraft. The dropsondes will normally take 20 min to fall to sea-level but only 10 minutes to descend to below 20 kft. For a passenger aircraft travelling at 500 mph, the no-drop proximity limit is not envisaged to exceed about 140 km. The dispenser control electronics, checks that there are no other aircraft beneath 55 kft altitude (typical minimum HAPS altitude) within the "no-drop proximity limit", based on ADS-B In data and if clear, dispenses the dropsonde, if not, delays its release until the proximity limit is clear of traffic.

Conventionally dispensed dropsondes transmit their data in near real-time, typically once per second, but to minimise transmitter "on time" and hence minimise average power required, which in turn minimises necessary battery mass, data is stored on the dropsonde and is transmitted in a short burst periodically, i.e. once every 30 seconds at high altitude and more frequently at very low altitude so that minimal data is not lost when surface is reached. This data is received by the dropsonde receiving system on board the dispensing HAPS platform. FIG. 10. presents a schematic of the constellation 12 of HAPS platforms 2 releasing dropsondes 1 and the dropsonde data network description to the end users of the data. Each dropsonde 1 transmits its data which is received by the HAPS platform 2 dropsonde receiver, this data is passed to the HAPS platform datalink which can be a Line of Sight (LOS) data link, but is more commonly a Beyond Line Of Sight (BLOS) data link 38 e.g. SATCOM. The BLOS datalink service provider 38 transmits the data either directly or via the internet 40 to the HAPS Ground Control System (GCS) 42, which manages the constellation 12 of HAPS platforms and their missions. The GCS 42 forwards dropsonde data and accompanying meta data to the HAPS meteorological data servers 44. The dropsonde data as well as any other meteorological sensor data provided by the HAPS constellations is stored on the HAPS meteorological data servers 44. This is a network of computers and servers providing access to archived data as well as real-time observation data from the most recent dropsondes or other meteorological data provided by the HAPS constellation. HAPS meteorological data service subscribers access the HAPS meteorological data via the HAPS meteorological data servers.

FIG. 10. gives some examples of HAPS Data Service Subscribers and the typical network architecture used to present data to end users.

The first example is the WMO Information System (WIS) Centres 46. WIS Centres are responsible for publishing metrological observation data and providing networks hubs that maintain synchronized copies of the WIS data catalogue, of which in this proposal the HAPS dropsonde data and indeed any other meteorological sensor data hosted on the HAPS platform could form part of this catalogue. WIS centres, maintain a cache of data and products for near-real-time exchange between operational centres 48 running NWP models and offer mechanisms to download or subscribe to data and products within the WIS catalogue from via the internet or telecom transfer 47. Similar customers referred to in FIG. 10. could include Military Organisations 52 using a dedicated secure network interface 50 and network 51 or other Private Organisations 56 using an interface 54 and network or the internet 55 as HAPS Data Service Subscribers.

The invention claimed is:

1. A measurement system comprising:
a plurality of High-Altitude Pseudo Satellites (HAPS) comprising fixed wing HAPS, having a span loaded fixed wing, an aspect ratio greater than 15 and wing loading less than 6 kg/m2, and/or lighter than air HAPS,
wherein each HAPS carries a plurality of lightweight dropsondes, each dropsonde including sensors and a transmitter,
wherein the plurality of high-altitude pseudo satellites located in a geographical array over at least part an area of the earth,
wherein the dropsondes are deployed from the HAPS at predetermined times,
wherein the dropsondes gathering sensed data after deployment,
wherein the sensed data from the dropsondes are transmitted to the HAPS,
wherein the HAPS comprises a regenerative solar electric power system and is configured to loiter for an extended period of time of at least several weeks,
wherein the dropsondes are stowed in a stacked configuration in a conveyor mechanism within the dispenser, each dropsonde including an electrical contact forming an electrical connection with a conducting member in the conveyor mechanism such that the dropsonde is held in a hibernation state and receives power from the HAPS for environmental conditioning, the electrical connection being further configured to warm and charge the dropsonde power system to prevent failure on release due to low temperature, and
wherein the conveyor mechanism presents dropsondes in sequence to a separator mechanism which, upon separating a dropsonde from the stack, causes the electrical connection to be broken, thereby triggering the dropsonde to initialize and self-power prior to deployment.

2. The measurement system according to claim 1, wherein the dropsondes are deployed by each HAPS at predetermined time intervals.

3. The measurement system according to claim 1, wherein the HAPS including fixed wing vehicles.

4. The measurement system according to claim 1, wherein the HAPS including lighter than air vehicles.

5. The measurement system according to claim 1, wherein the HAPS transmits the sensed data to a satellite.

6. A measurement data system comprising;
an array of HAPS deploying dropsondes according to claim 1,
a BLOS datalink service,
a ground control and data server for the measured data, and
a user database for receiving the measured data.

7. The measurement data system according to claim 6, wherein the HAPS array is a grid constellation.

8. The measurement system according to claim 1, wherein the dispenser includes an aperture through which the dropsonde to be deployed exits the dispenser.

9. A dropsonde for use with a HAPS according to claim 1 comprising;
a PCB carrying a sensor or sensors,
a transmitter, and
a retarding member.

10. The dropsonde according to claim 9, wherein the dropsonde includes a contact, and the HAPS dispenser includes a conducting member, such that the dropsondes stowed in the dispenser are in electrical contact with the dispenser.

11. The measurement system according to claim 1, wherein the conveyer mechanism provides electrical power to the dropsondes to provide environmental conditioning and trigger initialization when the power is removed.

12. The measurement system HAPS according to claim 1, wherein there is included at least two dispensers such that the conveyer mechanism of each dropsonde moves the dropsondes in different directions.

13. The measurement system according to claim 1, wherein the dispensers disposed on the HAPS such that the center of gravity of the gravity of the HAPS is located in the geometric center of the HAPS.

14. A fixed wing HAPS according to claim 1, wherein the dispenser location is chosen from at least one of the following positions:
a nose,
a tail,
a wing underside, or
a wing tip.

15. The measurement system according to claim 1, wherein each dropsonde weighs less than 50 g and a plurality of dropsondes are arranged in a stacked configuration.

16. The measurement system according to claim 1, wherein a plurality of dropsondes are disposed in a tube.

\* \* \* \* \*